United States Patent Office 3,428,062
Patented Feb. 18, 1969

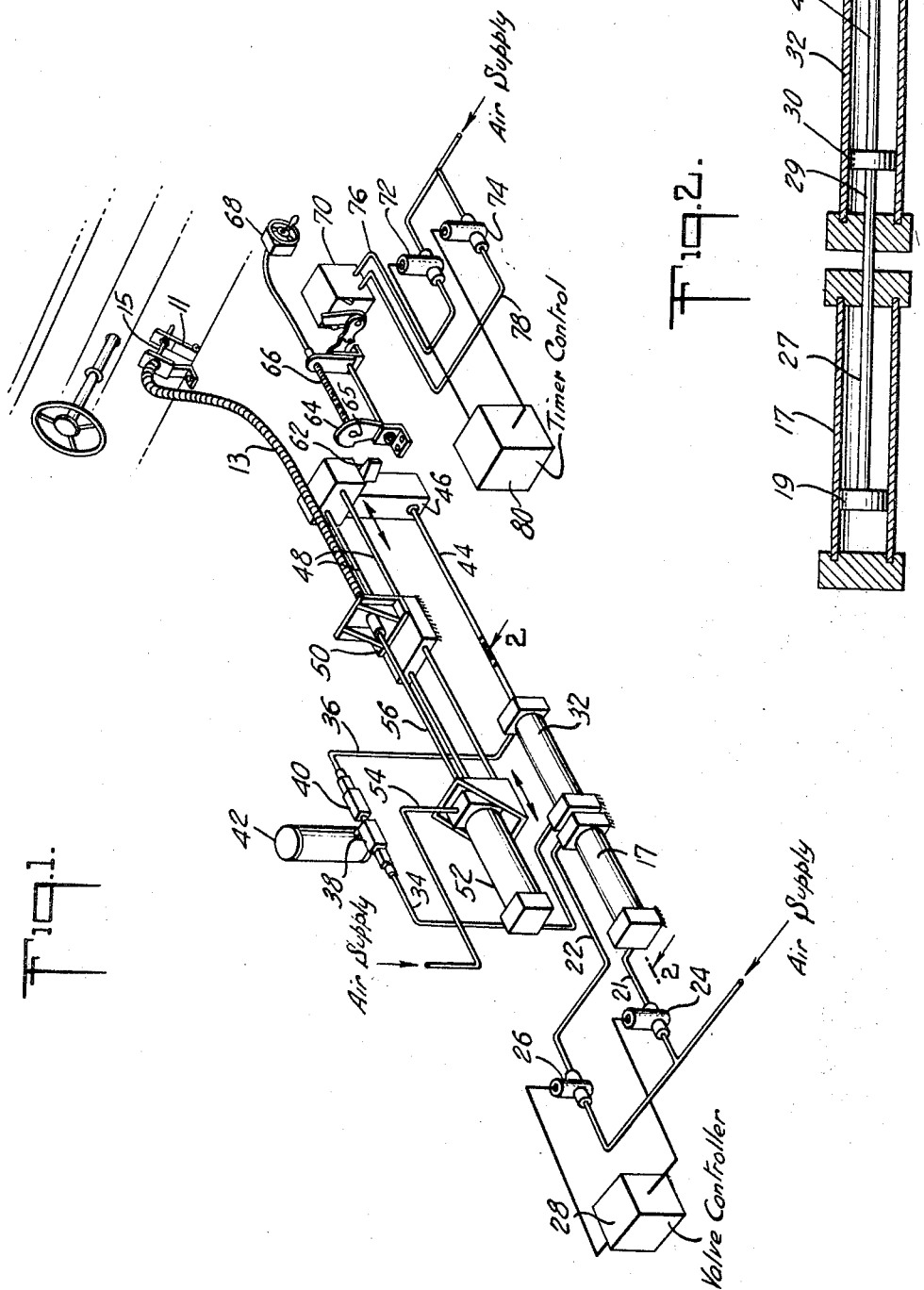

3,428,062
AUTOMATIC ACTUATING AND
CONTROL MECHANISM
Norman E. Flournoy, Sr., and Vernon M. Barnes, Jr., Richmond, Va., assignors, by mesne assignments, to Texaco Inc., New York, N.Y., a corporation of Delaware
Filed Oct. 14, 1966, Ser. No. 587,646
U.S. Cl. 137—30                7 Claims
Int. Cl. F01b 25/06, 25/12; F15b 13/10

This invention relates to an automatic actuating and control mechanism and more particularly to an actuating and control mechanism capable of positioning a throttle or the like in accordance with a predetermined sequence of positions.

An important characteristic of today's gasolines is their octane content. Likewise, today's automotive engines have particular octane requirements. In establishing the octane requirements of engines and the performance characteristics of gasolines, actual testing of particular grades of gasoline in various automotive engines is essential. This has generally been done by road tests utilizing test drivers. However, various comparison tests are dependent on the skill of the test driver and repeatability of exact conditions such as throttle position, speed, etc. are not generally possible. To overcome these problems, devices known as dynamometers have been introduced which are utilized in connection with other simulation apparatus to drive and stimulate in the laboratory actual road conditions for the testing of automotive engines and gasolines. The throttle actuators used in conjunction with this apparatus are generally complicated arrangements which respond to a programmed sequence of signals.

It is the principal object of the present invention to provide an automatic actuating and control mechanism which contains a simple mechanical arrangement for establishing a predetermined sequence of output positions.

It is another object of the present invention to provide an automatic actuating and control mechanism which is electrically controlled and pneumatically actuated.

It is a further object of the present invention to provide an automatic actuating and control mechanism in which the rate of response of the actuator is simply controlled.

It is another object of the present invention to provide an automatic actuating and control mechanism in which the controlled element can be manually operated while under automatic control.

According to the invention there is provided an actuating and control mechanism for positioning an output element in a predetermined sequence of steps. The apparatus comprises a drive train connected to the output element and a control means for controlling the operation of the drive train. The drive train comprises a pneumatic actuator and a hydraulic rate controller connected in tandem. The hydraulic rate controller includes at least one adjustable flow valve which controls the rate of response of the drive train. The drive train has connected thereto at least one projecting member which is carried therewith. At least one stop member is provided adjustable to a stopping position and a non-stopping position with respect to a respective projecting member. The stopping position is in the path of travel of the respective projecting member to stop the drive train and the non-stopping position is out of the path of travel of the respective projecting member to release the drive train. The stop members are actuated by stop actuators each of which provides movement of one of the stop members to its stopping or non-stopping positions. Control timing means are provided for energizing each of said stop actuators in accordance with a predetermined function to provide a predetermined sequence of movement steps of the output member.

The above mentioned and other features and objectives of this invention and the manner of attaining them will become more apparent and the invention itself will be best understood by reference to the following description of an embodiment of the invention taken in conjunction with the accompanying drawings wherein:

FIG. 1 is a pictorial schematic representation of an automatic actuating and control mechanism for positioning an engine throttle.

FIG. 2 is a vertical cross-sectional view along line 2—2 of FIG. 1 showing the tandem connection between the pistons in the cylinders of the pneumatic actuator and hydraulic rate controller.

Figure 3:
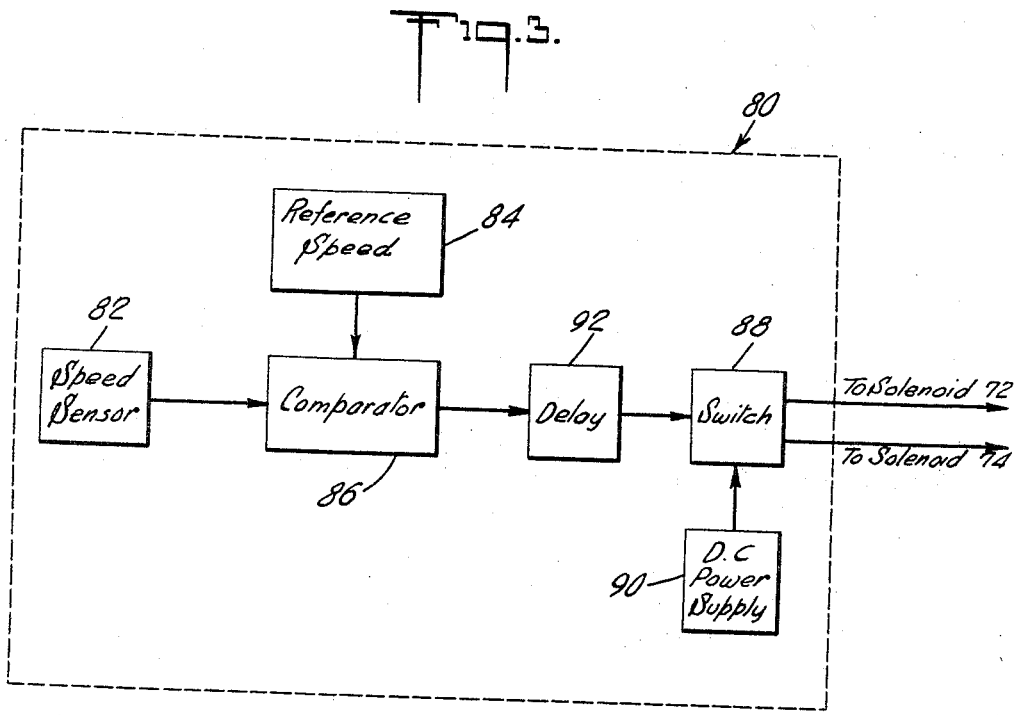
FIG. 3 is a schematic diagram of the timer control of FIG. 1.

Referring to FIG. 1, it can be seen that the output member is a throttle or accelerator 11 of an engine which is positioned by a push-pull cable 13. The core 15 of the cable is connected to the accelerator 11 at one end, and to the drive train of the actuating and control mechanism at the other end. The drive train consists of an actuator which includes a pneumatic cylinder 17 which contains a drive piston 19 (shown in FIG. 2). The drive piston 19 is driven in the cylinder 17 by pneumatic pressure which is applied to either side of the piston by conduits 21 and 22, respectively. Each of the conduits 21 and 22 contains a solenoid valve 24 and 26, respectively. Each of the valves 24 and 26 when energized electrically, provides for the passage of pneumatic pressure therethrough from the air supply so that the piston can be driven in the cylinder in either direction depending upon which of the solenoid valves 24, 26 is energized. The valves 24 and 26 are energized by electric signals which are provided by a valve controller 28 which consists essentially of a power supply and a switch for providing the electric signals to operate the desired one of the valves 24 and 26 for actuating the piston 19 of the cylinder 17 in the desired direction.

Referring to FIG. 2, it can be seen that the piston rod 27 output of the pneumatic cylinder 17 is connected to the input rod 29 of the piston 30 within the hydraulic cylinder 32. As can be seen from FIG. 1, the hydraulic conduits 34 and 36 are connected to opposite side of the piston within the hydraulic cylinder 32. These conduits 34 and 36 contain respective adjustable flow valves 38 and 40, and a common fluid reservoir 42. By means of these adjustable flow valves 38 and 40, the movement of the piston 30 within the hydraulic cylinder 32 is limited to a particular rate of displacement. The rate, of course, is dependent upon the size of the restrictions to which the adjustable flow valves 38 and 40 are set. Accordingly, it will be appreciated that the valves, hydraulic cylinder 32 and piston 30 establishes the rate of response of the piston 19 in pneumatic cylinder 17 to provide the actuation of the drive train of the actuating mechanism. The output piston rod 44 of the piston 30 within the hydraulic cylinder 32 is connected to a drive train element 46. As can be seen, this drive train element 46 has attached thereto additional rods 48 which are positioned parallel to the previously mentioned piston rods of the drive train. The additional rods 48 pass through a fixed bearing element 50 and are connected to the cylinder 52 of an override piston and cylinder 52 arrangement in the drive train of the throttle actuating mechanism. The override piston and cylinder 52 has connected thereto an override air supply via a conduit 54. The air pressure keeps the piston normally at the end of the cylinder 52 away from the accelerator 11 which is the left end in FIG. 1. Thus, any movement of the drive train causes corresponding movement of the override piston and cylinder 52, which movement is transferred to the push-pull cable 13 via the output rod 56 of the piston within the override cylinder 52. The output rod 56 of the piston of the override cylinder 52 is connected to the push-pull cable 13 at the bearing 50 and transfers the motion of the drive train from the output rod 56 to the core 15 of the push-pull cable 13. The push-pull cable 13 transfers the drive train motion to corresponding motion of the accelerator 11. The override piston and cylinder 52 allows the accelerator 11 to be manually operated without affecting the drive train. For example, any downward motion of the accelerator 11 will be transferred to the piston of the override cylinder 52 which will move away from the left end thereof and thus not transfer the motion to the override cylinder 52 which is connected in the drive train of the throttle actuating mechanism. The pneumatic pressure holding the piston at the left end of the override cylinder 52 can be relieved by any suitable relief valve means in the conduit 54 thereby allowing the override operation.

Referring again to the drive train element 46, there is provided a projecting element 62 extending from the side thereof. It will be appreciated, that a number of such projecting elements can be utilized. However, for convenience, only one such element is shown. In the path of the projecting element 62, there is located a stop element 64. The stop element 64 is connected to a threaded shaft 66 through a similarly threaded hole 65 therein. The shaft can be rotated via an adjusting mechanism 68 which contains a locking device and a digital read-out means. This adjusting mechanism provides the longitudinal positioning of the stop element 64 with respect to the path of travel of the projecting element 62. Thus, the drive train will be stopped by the stop element 64 when the projecting element 62 is intercepted thereby. To provide the sequence of positions of the throttle, the stop element 64 is movable or rotatable so that it can be moved from the path of the projecting element 62. This is accomplished by a stop actuator 70 which is pneumatically controlled by means of solenoid valves 72 and 74 which are located in conduits 76 and 78, respectively. The solenoids of the valves 72 and 74 are energized by electric signals from a timer control 80 thereby connecting pneumatic pressure to the actuator 70 from a regulated air supply to either insert or remove the stop element 64 from the path of the projecting element 62. The stop position of the throttle is therefore determined by the longitudinal position of the stop element 64 when it contacts the projecting element 62 to stop the drive train. It will be appreciated that a number of stop elements can be located sequentially in the path of travel of each projecting element to provide the sequence of position steps of the throttle element. The time the throttle remains in a position determined by one of the respective stop elements is determined by the timer control 80 which in accordance with a particular predetermined time removes the stop element 64 from the path of the projecting element 62 and allows the drive train to further move the throttle 11 to a new position determined by another stop element.

The timer control 80, shown in more detail in FIG. 3, consists of a speed sensor 82 which can be a tachometer which measures the speed of the engine the accelerator 11 is controlling. A reference speed element 84 is provided by means of which a desired reference speed can be entered. This element could be a potentiometer or the like. An electric signal representative of the sensed speed is applied to a comparator 86 along with an electrical signal representative of the desired or reference speed from the reference speed element 84. The comparator 86 produces an output signal when the two input electrical signals are equal. The output signal is applied to a simple switch 88 which is arranged to switch the DC voltage from a DC power supply 90 to one or the other of the solenoids 72 and 74 controlling the stop actuator 70. In the situation of a comparison signal the switch 88 energizes the appropriate solenoid 72, 74 causing operation of the stop actuator 70 to remove or rotate the stop element 64 out of the path of the projecting element 62 thereby allowing the drive train to proceed to the next stop. A delay element 92 may be provided directly after the comparator 86. The comparison signal is applied to the delay element 92 before reaching the switching element 88. This delay element 92 provides a predetermined delay time during which the engine is maintained at the reference speed by maintaining the throttle at the position until the delay time has passed and allowed the comparison signal to cause the switch 88 to respond so as to energize one of the solenoids 72, 74 to remove the stop element 64 and allow the throttle to be moved to a further position.

The timer control 80 is not limited to the particular arrangement shown in FIG. 3. That is, the time of removal of the stopping element 64 can be determined in accordance with some other operating characteristic or function rather than engine speed. The stop 64 could be removed in response to a straight time function. The contacting of the projecting element 62 by stop element 64 could cause a switching action, thereby connecting a DC voltage to operate the appropriate solenoid valve 72, 74 to cause the stop actuator 70 to remove the stop element 64. It will be appreciated that appropriate time delays could be introduced to control the time of removal of successive stop elements thereby making the steps of the sequence strictly a predetermined function of time.

Figure 4:
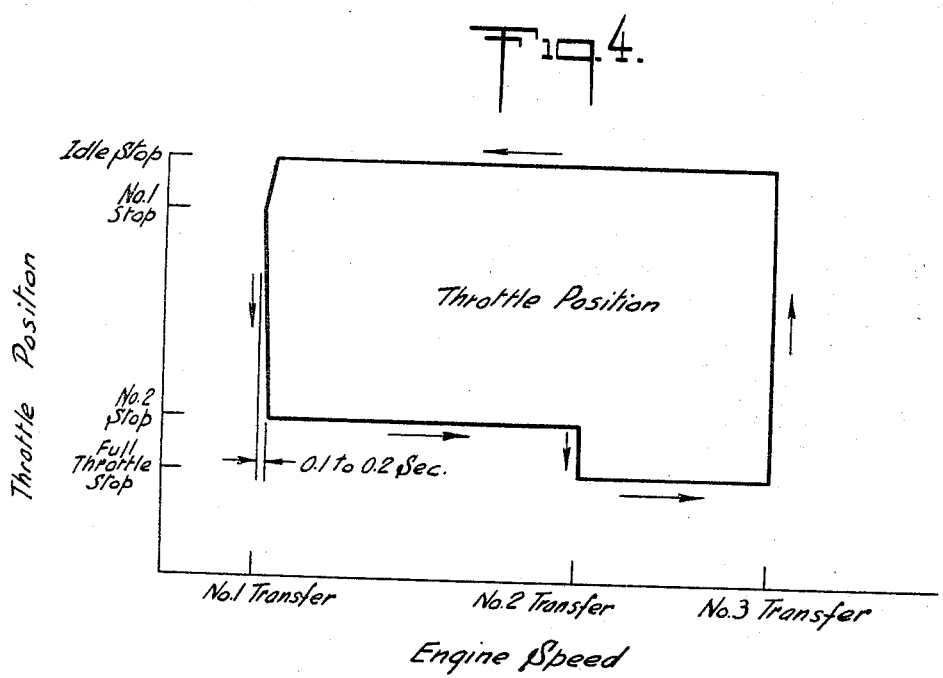
FIG. 4 is a graphical representation of the steps of throttle position at the various engine speeds.

Referring to FIG. 4, there is shown a graph of throttle position versus engine speed. As can be seen, the throttle is initially at idle speed against an idle stop from whence it is moved against the No. 1 stop. The No. 1 stop is removed in conjunction with a particular signal representative of the time established by the control timer. The time signal controlling the stop is generated at a predetermined engine speed which is indicated on the graph as the No. 1 transfer speed. Once the stop is removed the drive train positions the throttle against the stop No. 2 which takes as can be seen from about .1 to .2 second. The drive train is held from movement by the No. 2 stop until a particular speed of the engine is attained; this being established as the No. 2 transfer speed at which time the stop is removed and the drive train positions the throttle further until the next stop is reached. In the graph of FIG. 4 this is the full throttle stop. As can be seen from the graph, a number of predetermined steps of throttle position are attained.

It should be appreciated that the present invention is not limited to positioning a throttle of an engine but can be utilized in a number of different applications wherein a sequence of positions of an output element in accordance with a predetermined function are desired.

Obviously, many modifications and variations of the invention as hereinabove set forth may be made without departing from the spirit and scope thereof, and therefore, only such limitations should be imposed as are indicated in the appended claims.

We claim:
1. An actuating and control mechanism for positioning an output element in a predetermined sequence of steps comprising a drive train connected to the output element, control means for controlling the operation of said drive train, said drive train comprising a pneumatic actuator and an hydraulic rate controller connected in tandem, at least one adjustable flow valve connected to said hydraulic rate controller to control the rate of response of said hydraulic rate controller and drive train, at least one projecting member connected in said drive train for movement therewith, at least one stop member adjustable to a stopping position and a non-stopping position with respect to each of said projecting members, said stopping position being in the path of travel of said respective projecting member to stop said drive train and said non-stopping position being out of the path of travel of said respective projecting member to release said drive train, a plurality of stop actuators each providing movement of one of said stop members to its stopping and non-stopping positions, and control timing means for energizing each of said stop actuators in accordance with a predetermined function to provide a timed sequence of movement steps of said output member.

2. Apparatus in accordance with claim 1 wherein said pneumatic actuator comprises a cylinder containing a piston adapated for operation in response to air pressure and said hydraulic rate controller comprises a cylinder containing a piston adapted for operation in response to the movement of the piston of said pneumatic actuator, said hydraulic cylinder being filled with hydraulic fluid, a hydraulic fluid passage extending around the piston of said hydraulic rate controller, said adjustable flow valve being connected in said hydraulic fluid passage to introduce a resistance to hydraulic flow thereby establishing a rate of response of said drive train.

3. Apparatus in accordance with claim 1, wherein said drive train further includes an override pneumatic actuator which comprises a cylinder containing a piston, the cylinder being connected to the drive train and being driven in accordance with said drive train to transmit the motion therethrough, said piston being connected to the output element, thereby providing movement of the output element independent of said drive train within the limits of said travel of the piston within the override actuator cylinder.

4. Apparatus according to claim 1, wherein said stop members are longitudinally positionable along the path of their respective projecting members.

5. Apparatus in accordance with claim 1, wherein said output element is an engine throttle and said control timing means for energizing said stop actuator in accordance with a predetermined function comprises a comparator, an engine speed sensing means connected to said comparator, and a presettable reference speed unit connected to said comparator, said comparator providing an output signal to energize said stop actuator when the engine speed reaches the reference speed.

6. Apparatus in accordance with claim 5, wherein a delay means is connected to said comparator for providing a predetermined time delay of said output signal after the engine speed reaches the reference speed.

7. Apparatus for positioning the throttle of an engine in a predetermined sequence of steps comprising a push-pull cable having one end of the core operatively connected to the throttle, a drive train connected to the other end of said cable core for driving said core and said throttle, control means for operating said drive train, said drive train comprising a pneumatic actuator and a hydraulic rate controller connected in tandem, at least one adjustable flow valve connected to said hydraulic rate controller to control the rate of response of said hydraulic rate controller and said drive train, at least one projecting member connected in said drive train for movement therewith along a fixed path, at least one stop member adjustable to a stopping position and a non-stopping position located in the path of each of said projecting members, said stopping position being in the path of travel of said corresponding projecting member and said non-stopping position being out of the path of travel of said corresponding projecting member, a stop actuator for each of said stop members for providing movement of said stop members to their stopping and non-stopping positions, control timing means for energizing each of said stop actuators, each of said control timing means comprising an engine speed sensing means, a presettable reference speed unit, and a comparator for providing an output signal to energize said respective stop actuator when the engine speed reaches the associated reference speed.

References Cited
UNITED STATES PATENTS

| | | | |
|---|---|---|---|
| 2,209,158 | 7/1940 | Goldsmith | 137—16 X |
| 2,982,381 | 5/1961 | Vogel | 137—57 X |
| 3,291,146 | 12/1966 | Walker | 137—30 X |
| 3,340,952 | 9/1967 | Day | 137—30 X |

CLARENCE R. GORDON, *Primary Examiner.*

U.S. Cl. X.R.

137—18, 26